Sept. 22, 1925.  1,554,210
D. W. GRIFFITH
METHOD AND MEANS FOR TAKING MOVING PICTURES
Filed Nov. 17, 1921
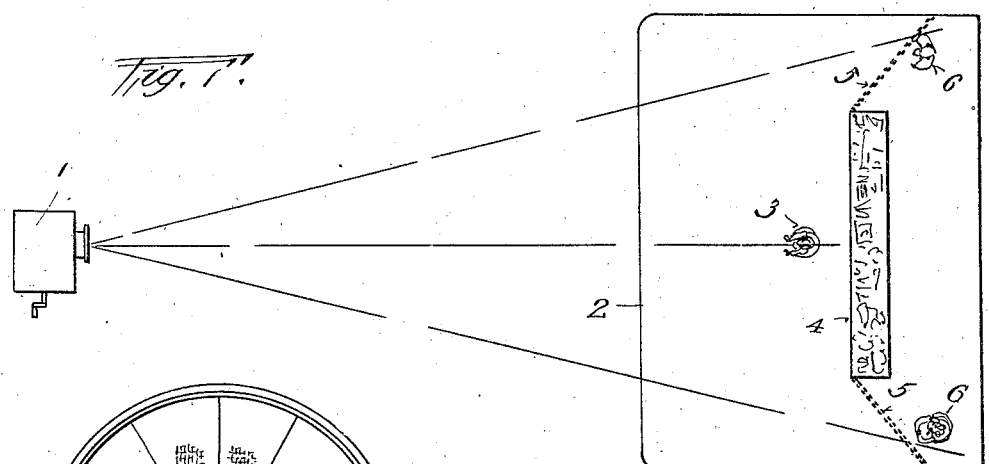
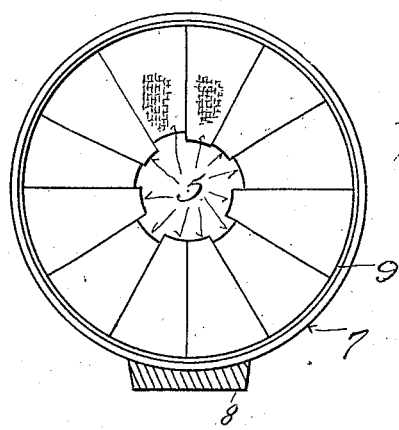
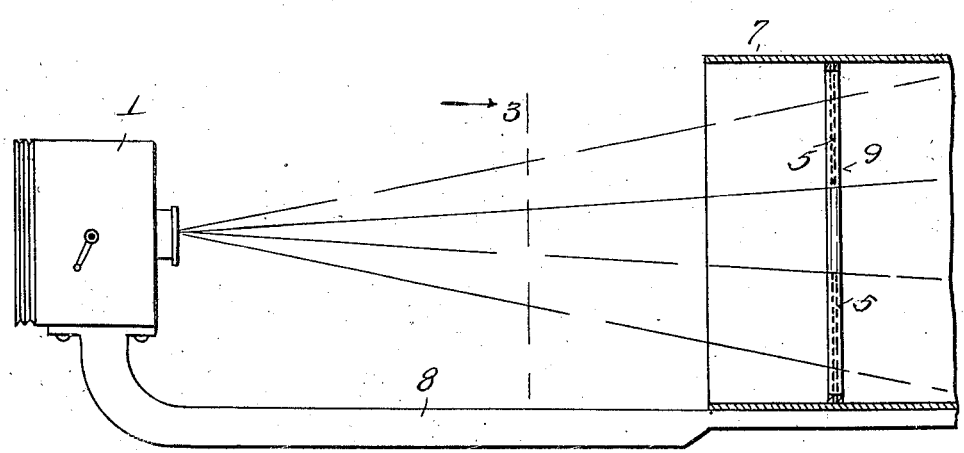
INVENTOR
David W. Griffith
BY Ellery Edwards
ATTORNEY Patented Sept. 22, 1925.

1,554,210

UNITED STATES PATENT OFFICE.

DAVID WARK GRIFFITH, OF MAMARONECK, NEW YORK.

METHOD AND MEANS FOR TAKING MOVING PICTURES.

Application filed November 17, 1921. Serial No. 515,873.

*To all whom it may concern:*

Be it known that I, DAVID WARK GRIFFITH, a citizen of the United States, and a resident of Mamaroneck, county of Westchester, and State of New York, have invented a new and useful Improvement in Methods and Means for Taking Moving Pictures, of which the following is a specification.

The object of my invention is to provide a process and an apparatus, whereby backgrounds may be taken in connection with foregrounds with a hazy and diaphanous effect and with a good perspective, although such objects may be crude and inexpensive and on a reduced scale so that where my invention is employed artistic pictures may be taken with a minimum of expense.

This and other objects are accomplished by my invention, one embodiment of which is hereinafter more particularly set forth.

For a more detailed description of my invention, reference is to be had to the accompanying drawings, forming a part hereof, in which—

Figure 1 is a plan view of one embodiment of my invention.

Figure 2 is a view partially in section of another embodiment of the same, and

Figure 3 is a sectional view, taken on the line 3—3 of Figure 2, looking in the direction of the arrows.

Throughout the various views of the drawings, similar reference characters designate similar parts.

Where my invention is employed, a camera 1, suitable for taking moving or other pictures, is used in connection with a stage 2 with an actor or other object 3 and suitable scenery 4, all of which may be of the conventional kind. If a picture were taken with what has just been described, it would be without the artistic effects which are produced by my invention. These artistic effects are produced by placing a gauze 5 which may be black or of any suitable color, between the camera 1 and an object 6 in the background so that the object 6 will appear in the negative when it is developed with a shadowy effect and in proper perspective. This object may be made with a reduced scale and it may be very crude, and yet be entirely satisfactory because of the effect of the gauze between it and the camera.

In the embodiment of my invention shown in Figure 1, the gauze 5 is placed close to the scenery and away from the camera. In the embodiment of my invention shown in Figures 2 and 3 this gauze is placed in a cylinder 7 which is supported by a bracket 8 from the camera 1 and is secured by means of rings 9 or in any other suitable way, these rings being placed in the cylinder 7.

The gauze 5 may be used, as above stated, in any color and it may be used in as many layers or thickness as desired, and may be made thicker in some places than in other places according to the nature of the picture to be produced. Howsoever employed, according to this invention, it will produce shadowy and artistic effects and greatly reduce the cost of obtaining desirable backgrounds in moving pictures.

From the foregoing, it is apparent that the term "foreground" as used herein means what is exposed directly to the lens of the camera and "background" means what is exposed through gauze to the lens of the camera.

While I have shown and described some embodiments of my invention, it is obvious that it is not restricted thereto, but that it is broad enough to cover all structures that come within the scope of the annexed claims.

Having thus described my invention, what I claim is:

1. The method of taking photographs which consists of making an exposure while interposing a gauze between the background and the camera but not between the foreground and the camera, so that a perspective effect may be produced in a shadowy and artistic manner when a photograph is taken.

2. An apparatus for taking photographs with artistic effects composed of a camera, an object for a foreground and a background and a gauze between the camera and background, but not between the camera and the foreground, whereby the object may be photographed with an artistic effect.

3. An apparatus for taking photographs, a camera, a foreground containing an object to be photographed, a background containing another object to be photographed and a gauze between the object in the background and the camera.

4. In an apparatus for taking photographs, a camera, a cylinder secured to said camera, a gauze mounted in said cylinder and projecting inwardly towards the center thereof, but not all the way to the center so that photographs may be taken through the cylinder, parts of which will be through the gauze and parts of which will be clear of the gauze, whereby photographs may be made with shadowy, perspective and artistic effects.

In testimony whereof, I have hereunto set my hand and seal this 28th day of October, 1921.

DAVID WARK GRIFFITH.